United States Patent
Lichtenauer

[11] 3,713,316
[45] Jan. 30, 1973

[54] TOOTHED TOOL FOR AN APPARATUS FOR THE CHIPLESS GENERATION OF GEARS

[75] Inventor: Gerd Lichtenauer, Unterofaffenhofen, Germany

[73] Assignee: Carl Hurth Maschinenund Zahnradfabrik, Munich, Germany

[22] Filed: March 26, 1971

[21] Appl. No.: 128,270

[30] Foreign Application Priority Data

July 29, 1970 Germany......................P 20 37 638.9

[52] U.S. Cl....................................72/102, 29/159.2
[51] Int. Cl. ................................................B21h 5/02
[58] Field of Search ........72/102, 107, 108; 29/159.2

[56] References Cited

UNITED STATES PATENTS 1,847,848   3/1932   Ragan ..................................29/159.2

FOREIGN PATENTS OR APPLICATIONS 1,802,228   10/1969   Germany...............................72/102

Primary Examiner—Lowell A. Larson
Attorney—Woodhams, Blanchard and Flynn

[57] ABSTRACT

Tool for the chipless generation of gear teeth by rolling. The flanks of each tool tooth are provided with alternate high and low zones which blend in the axial direction of the tool smoothly into each other and provide ridges and hollows extending from the addendum to the deddendum on each flank of each tool tooth. The crowns of said ridges on flanks facing each other across a single tool space may be positioned oppositely to each other and circumferentially following successive pairs of crowns may be progressively offset axially to effect working across the full axial length of the workpiece tooth. Alternatively, said crowns may be opposite each other on each individual tooth of the tool and successively and axially offset with respect to each other on each successive tooth. The smooth blending of ridges and hollows on the tool teeth provide for the generation of a more smooth workpiece tooth and eliminate the line markings on the workpiece teeth which sometimes resulted from the previously known practice of providing abrupt lines or planes of demarcation between pressure ridges and recesses on successive tool teeth.

6 Claims, 2 Drawing Figures

Inventor:
GERD LICHTENAUER

TOOTHED TOOL FOR AN APPARATUS FOR THE CHIPLESS GENERATION OF GEARS

The invention relates to a toothed tool for the chipless generation of gears by a rolling interaction of workpiece and tool.

The basic purpose of the invention is to increase the surface pressure for effecting a chipless generation of gear teeth by means of burnishing or rolling at a given contact force, or, conversely, to reduce the contact force necessary for providing the surface pressure required for the deformation to be obtained, whereby to minimize both the complexity and cost of the machine on which the work is carried out and the chucking device for holding the workpiece.

To attain the basic purpose of the invention, the invention provides that the surfaces of the teeth of the tool are divided into surface portions, which project toward the tooth zone and which are arranged offset with respect to one another on circumferentially adjacent teeth, and recessed surface portions. The invention further provides that these surface portions blend smoothly into one another in the form of tooth surfaces which are crowned in the longitudinal direction of the tooth.

Line markings often occur when there is an abrupt demarcation between the projecting surface portions and the recessed surface portions, which markings are avoided by the invention.

The invention is discussed in connection with FIGS. 1 and 2.

Machines for the chipless generation of surfaces of the gears are known; therefore they need not be illustrated and described here.

Figure 1:
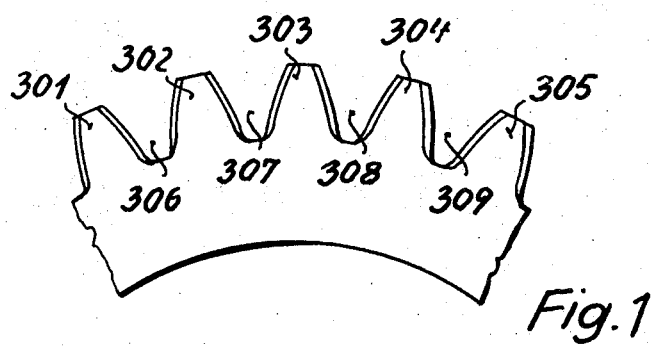
FIG. 1 is a schematic side view of a section of a gearlike tool according to the invention.
Figure 2:
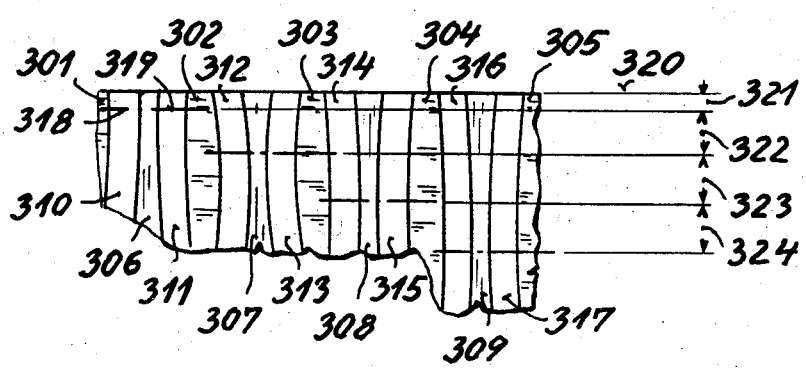
FIG. 2 is a schematic and unwound view of a tool according to the invention as viewed toward the top of the teeth.

FIG. 1 illustrates as an exemplary embodiment for the invention a portion of a tool 21 which is similar to a gear. FIG. 2 illustrates in an unwound manner a top view of the tool of FIG. 1. The teeth 301 to 305 have a convexity in their axial direction which convexity is convex toward each respective tooth space 306 to 309. While these cambered tooth surfaces 310 to 317 are staggered with respect to successive tooth spaces, in the illustrated embodiment they are so arranged that the peaks of the convexity are positioned opposite one another on opposite sides of a given tooth space. Thus the peaks 318, 319 of the continuously curved surfaces 310, 311 defining the space 306 are opposite one another. These peaks can as desired, either coincide with a front surface 320 of the tool or they can be spaced a desired distance 321 therefrom. The convexity of the tooth surfaces 312, 312 of the next space 307 is offset at an amount 322 from the convexity of the aforementioned surfaces. The convexities of all of the circumferentially following teeth are offset by amounts 323, 324 with respect to the convexities of the above-mentioned teeth.

When the tool of the invention has turned through a full rotation, the convexities of the successive teeth have progressed across the entire gear width which means that at any desired relation between the number of teeth on the workpiece and the number of teeth of the tool, each workpiece tooth successively contacts the peaks of the cambered surfaces.

According to a different embodiment, the peaks of the cambered tooth surfaces are opposite one another on each respective tooth rather than in relation to the spaces. The staggered or offset convexity as discussed above can be manufactured, among other ways, on a gear-grinding machine, the grinding disk of which rolls in a tooth-to-tooth method on the tooth surfaces which are to be ground.

The convexity results in a light ripple on the tooth surfaces of the workpiece which ripple is similar to very flat feed markings. However, said ripple is not harmful because it merges in a gear set in the thickness of the oil film. The ripple may even be advantageous because it helps to draw the lubricant into the zone of the surface contact and thus improves the antifrictional properties.

The embodiments of the invention in which an exclusive property or privilege is claimed are defined as follows:

1. In a gearlike tool for use in machines for forming teeth on the peripheries of gear blanks by rolling, said tool being in the form of a rotary gear having a plurality of tool teeth around the periphery thereof, the improvement comprising:
    at least one tooth surface of each tool tooth having at least one smoothly cambered tooth surface projecting into the tooth space between a pair of tool teeth, said cambered tooth surfaces on the same circumferentially facing tooth surface of each tool tooth reaching a peak at axially spaced locations on said teeth.

2. The improvement according to claim 1, wherein the cambered tooth surfaces on oppositely facing tooth surfaces reach a peak opposite one another.

3. The improvement according to claim 2, wherein said gear blanks are formed into one of spur and helical gears.

4. The improvement according to claim 3, wherein the axes of said tool and said gear blank are substantially parallel during rolling.

5. A gearlike tool for use in machines for forming teeth on the peripheries of gear blanks by rolling, comprising:
    a rotary member in the form of a gear having a plurality of tool teeth around the periphery thereof, at least one tooth surface of each tool tooth having at least one cambered surface defining an axially extending surface of continuous curvature projecting into the tooth space between a pair of tool teeth.

6. A tool according to claim 5, wherein said peaks of said cambered tooth surfaces on oppositely facing tooth surfaces are circumferentially aligned.

* * * * *